United States Patent
Narasimhan et al.

(10) Patent No.: US 7,226,765 B2
(45) Date of Patent: Jun. 5, 2007

(54) SOLVENT EXTRACTION OF POLYHYDROXYALKANOATES FROM BIOMASS

(75) Inventors: Karunakaran Narasimhan, West Chester, OH (US); Kenneth Yee, Cincinnati, OH (US); Angella Christine Cearley, Hamilton, OH (US); Donald Levengood, Mason, OH (US); Guo-Qiang Chen, Beijing (CN)

(73) Assignee: The Procter & Gamble Company, Cincinnati, OH (US)

( * ) Notice: Subject to any disclaimer, the term of this patent is extended or adjusted under 35 U.S.C. 154(b) by 51 days.

(21) Appl. No.: 11/169,448

(22) Filed: Jun. 29, 2005

(65) Prior Publication Data

US 2005/0287653 A1 Dec. 29, 2005

Related U.S. Application Data

(60) Provisional application No. 60/583,774, filed on Jun. 29, 2004.

(51) Int. Cl.
*C12P 7/62* (2006.01)
*C08L 61/00* (2006.01)
*C08L 61/06* (2006.01)
*C08G 63/00* (2006.01)
*C08G 63/66* (2006.01)

(52) U.S. Cl. ................... 435/135; 525/491; 528/361
(58) Field of Classification Search ................ 435/135; 525/491; 528/361
See application file for complete search history.

(56) References Cited

U.S. PATENT DOCUMENTS

| | | | | |
|---|---|---|---|---|
| 5,229,279 A | * | 7/1993 | Peoples et al. | 435/135 |
| 5,245,023 A | * | 9/1993 | Peoples et al. | 536/23.2 |
| 5,250,430 A | * | 10/1993 | Peoples et al. | 435/232 |
| 5,292,860 A | * | 3/1994 | Shiotani et al. | 528/361 |
| 5,552,515 A | * | 9/1996 | Hubbs et al. | 528/354 |
| 5,625,029 A | * | 4/1997 | Hubbs et al. | 528/354 |
| 5,650,555 A | * | 7/1997 | Somerville et al. | 800/264 |
| 5,894,062 A | | 4/1999 | Liddell | |
| 6,043,063 A | * | 3/2000 | Kurdikar et al. | 435/135 |
| 6,340,580 B1 | * | 1/2002 | Horowitz | 435/135 |
| 6,610,764 B1 | * | 8/2003 | Martin et al. | 523/124 |
| 2003/0004299 A1 | * | 1/2003 | Srienc et al. | 528/272 |
| 2003/0236320 A1 | * | 12/2003 | Martin et al. | 523/124 |

FOREIGN PATENT DOCUMENTS

| | | |
|---|---|---|
| WO | WO 97/07229 | 2/1997 |
| WO | WO 97/07230 | 2/1997 |
| WO | WO 98/46782 | 10/1998 |
| WO | WO 98/46783 | 10/1998 |
| WO | WO 99/51760 | 10/1999 |
| WO | WO 01/68890 A2 | 9/2001 |
| WO | WO 2004/013204 A2 | 2/2004 |
| WO | WO 2005/052175 A2 | 6/2005 |

OTHER PUBLICATIONS

International Search Report dated Sep. 9, 2005, 6 pages, PCT/US2005/023050.

* cited by examiner

*Primary Examiner*—Herbert J. Lilling
(74) *Attorney, Agent, or Firm*—Armina E. Matthews; Kim William Zerby

(57) ABSTRACT

Processes for the extraction of PHAs from biomass, said processes comprising: combining the biomass containing the PHAs with a single main solvent to form a biomass liquor; heating the biomass liquor to at least partially solubilize the PHAs from the biomass to form a PHA liquor; separating the biomass from the PHA liquor to form a PHA-enriched liquor; evaporating from 0% to about 50% of the single main solvent from the PHA-enriched liquor to form a solvent vapor and a concentrated PHA-enriched liquor; and cooling the concentrated PHA-enriched liquor to form precipitated PHAs and an impure solvent liquor. Optionally, further recovering the precipitated PHAs from the impure solvent liquor by filtration under pressure. A PHA-enriched liquor and a concentrated PHA-enriched liquor.

19 Claims, No Drawings

SOLVENT EXTRACTION OF POLYHYDROXYALKANOATES FROM BIOMASS

CROSS REFERENCE TO RELATED APPLICATION

This Application claims the benefit of U.S. Provisional Application Ser. No. 60/583,774, filed Jun. 29, 2004 (P&G Case 9699PL).

FIELD OF THE INVENTION

This invention relates to a process for the extraction of specific components from other biomass components. More specifically, this invention relates to a process for the extraction of a polyhydroxyalkanoate from a biological system, such as a plant or a bacterium, by performing the extraction with a solvent.

BACKGROUND OF THE INVENTION

Plastics such as polyesters are typically produced from petrochemical sources by well-known synthetic means. These petrochemical-based polymers take centuries to degrade after disposal. Concern over plastic waste accumulation in landfills has resulted in the recent movement toward using biodegradable polymers instead.

Synthetic biodegradable polymers have not enjoyed great success in the marketplace due to their high production cost. However, advances in biotechnology have led to less expensive means of production. Specifically, biodegradable aliphatic copolyesters are now produced by large-scale bacterial fermentation. Collectively termed polyhydroxyalkanoates or PHAs, these polymers may be synthesized in the bodies of natural or recombinant bacteria fed with glucose in a fermentation plant. Like their petrochemical precursors, the structural, and in turn mechanical, properties of PHAs may be customized to fit the specifications of the desired end product. However, unlike their petrochemical precursors, PHAs degrade both aerobically and anaerobically.

PHAs are enormously versatile, and as many as 100 different PHA structures have been identified. PHA structures may vary in two ways. First, PHAs may vary according to the structure of the R-pendant groups, which form the side chain of hydroxyalkanoic acid not contributing to the PHA carbon backbone. Second, PHAs may vary according to the number and types of units from which they are derived. For example, PHAs may be homopolymers, copolymers, and terpolymers. These variations in PHA structure are responsible for the variations in their physical characteristics. In turn, the variations in physical characteristics are what make generic application of the known PHA extraction processes inefficient.

Solvent extraction has been described as one method of extracting PHAs from bacteria and plants. However, solvent extraction of structurally flexible PHA polymers is challenging, because these PHAs crystallize slowly and tend to stick together to form a gel as the extraction solvent is removed. Gel formation is undesirable, because it requires the additional, costly steps of driving the solvent out of the gel, and flaking the remaining structurally flexible PHAs, to obtain a neat polymer. Several two-solvent extraction processes purport to circumvent the gel formation problem. However, two-solvent extractions may be more costly than single-solvent ones, because they generally require twice as much solvent and may preclude recycling of solvents without additional solvent processing, such as separating the two solvents.

For the foregoing reasons, there is a need for a simple and more economical process for extracting structurally flexible PHA polymers from bacteria and plants. Such a process would preferably involve a single recyclable main solvent that is preferably environmentally friendly.

SUMMARY

The inventors have surprisingly discovered a process for extracting structurally flexible PHA polymers from wet or dry biomass with minimal gel formation. The process involves the use of a single, recyclable main solvent that is preferably environmentally friendly.

The present invention therefore relates to a process for the extraction of structurally flexible PHAs from a wet or dry biomass comprising the following steps: combining the biomass containing the polyhydroxyalkanoates with a single main solvent to form a biomass liquor; heating the biomass liquor to at least partially solubilize the polyhydroxyalkanoates from the biomass containing the polyhydroxyalkanoates to form a PHA liquor; separating the biomass from the PHA liquor to form a PHA-enriched liquor; evaporating from 0% to about 50% of the single main solvent from the PHA-enriched liquor to form a solvent vapor and a concentrated PHA-enriched liquor, and cooling the concentrated PHA-enriched liquor to form precipitated polyhydroxyalkanoates and an impure solvent liquor and recovering the precipitated polyhydroxyalkanoates from the impure solvent liquor by filtration under pressure after said cooling;

wherein the polyhydroxyalkanoates comprise at least two randomly repeating monomer units, wherein the first randomly repeating monomer unit has the structure:

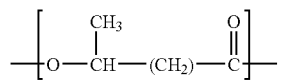

and the second or higher randomly repeating monomer unit has the structure:

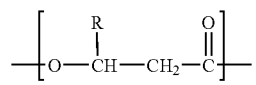

wherein R is a C3 to C7 alkyl or a mixture thereof; wherein from about 75 mol % to about 99 mol % of the randomly repeating monomer units have the structure of the first randomly repeating monomer unit and from about 1 mol % to about 25 mol % of the randomly repeating monomer units have the structure of the second randomly repeating monomer unit; and wherein the single main solvent is a butanol, a pentanol or a mixture thereof.

The process above wherein the biomass liquor comprises the single main solvent and the biomass in a ratio of from about 10 to about 100 parts single main solvent to about 1 part biomass.

The process above wherein the biomass liquor comprises the single main solvent and the biomass in a ratio of from about 50 parts single main solvent to about 1 part biomass.

The process above further comprising adding from about 3% to about 8% by weight of acetone to the biomass liquor before heating the biomass liquor.

The process above, wherein heating the biomass liquor increases the temperature of the biomass liquor to within from about 5° C. to about 20° C. of the boiling point of the solvent. The process above, wherein separating the biomass from the PHA liquor to form the PHA-enriched liquor is performed by high temperature filtration. The process above, wherein evaporating the solvent from the PHA-enriched liquor is performed by applying a vacuum to the PHA-enriched liquor. The process above, wherein the solvent vapor is recaptured as a solvent liquid. The process above, wherein the solvent liquid is recycled for further extractions.

The process above, further comprising washing the precipitated polyhydroxyalkanoates with the fresh single main solvent after recovering the precipitated polyhydroxyalkanoates from the impure solvent liquor by filtration under pressure. The process above, wherein the impure solvent liquor is recycled for further extractions. The process above, wherein the pentanol is iso-pentanol, 1-pentanol, 2-pentanol, 3-pentanol or a mixture thereof The process above, wherein the pentanol is iso-pentanol and/or the butanol is iso-butanol.

A process for extracting a polyhydroxyalkanoates from a dry biomass containing the polyhydroxyalkanoates comprising the steps of: combining the dry biomass containing the polyhydroxyalkanoates with a single main solvent to form a biomass liquor; heating the biomass liquor to at least partially solubilize the polyhydroxyalkanoates from the biomass containing the polyhydroxyalkanoates to form a PHA liquor; separating the biomass from the PHA liquor to form a PHA-enriched liquor; evaporating from 0% to about 50% of the single main solvent from the PHA-enriched liquor to form a solvent vapor and a concentrated PHA-enriched liquor; and cooling the concentrated PHA-enriched liquor to form precipitated polyhydroxyalkanoates and an impure solvent liquor and recovering the precipitated polyhydroxyalkanoates from the impure solvent liquor by filtration under pressure after said cooling; wherein the polyhydroxyalkanoates comprise at least two randomly repeating monomer units, wherein the first randomly repeating monomer unit has the structure:

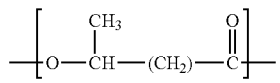

and the second or higher randomly repeating monomer unit has the structure:

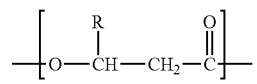

wherein R is a C3 to C7 alkyl or a mixture thereof; wherein from about 75 mol % to about 99 mol % of the randomly repeating monomer units have the structure of the first randomly repeating monomer unit and from about 1 mol % to about 25 mol % of the randomly repeating monomer units have the structure of the second randomly repeating monomer unit; and wherein the single main solvent is a butanol, a pentanol, toluene or a mixture thereof These and other features, aspects, and advantages of the present invention will become evident to those skilled in the art from a reading of the present disclosure.

All documents cited are, in relevant part, incorporated herein by reference; the citation of any document is not to be construed as an admission that it is prior art with respect to the present invention.

DETAILED DESCRIPTION

While the specification concludes with the claims particularly pointing out and distinctly claiming the invention, it is believed that the present invention will be better understood from the following description.

All percentages and ratios used herein are by weight of the total composition and all measurements are made at 25° C., unless otherwise designated.

"Comprising" means that other steps and other ingredients, which do not affect the end result, can be added. This term encompasses the terms "consisting of" and "consisting essentially of".

Several processes by which PHAs may be extracted from biomass are described in the art. These processes include PHA extraction though the use of enzymes, chemicals, mechanical means, and solvent extraction. Without being limited by theory, it is believed that a single main solvent process that (a) maximizes both the yield and purity of the extracted structurally flexible PHAs; and (b) minimizes the number of steps in the overall extraction process, best accomplishes the objective of economical, commercial extraction of structurally flexible PHAs.

The aforementioned objective is accomplished by: (a) using a single main solvent instead of a two-solvent system comprised by solvents or groups of solvents with substantially different solvation properties; (b) recycling the single main solvent for use in subsequent extractions; (c) preferably using an environmentally benign single main solvent; (d) reducing or eliminating a separate biomass cell lysis step; (e) reducing or eliminating the need to dry the biomass before the extraction process may be initiated; (f) reducing or eliminating the need for a second main solvent in order to precipitate structurally flexible PHAs without substantial gel formation; and/or (g) washing the extracted structurally flexible PHAs with fresh single main solvent instead of using other substances not of use in the rest of the extraction process, such as ethanol or activated charcoal.

The previously described embodiments of the present invention may have many surprising advantages over the current practice. For instance, the extraction method disclosed in the present invention may allow for extraction of structurally flexible PHAs to obtain a neat polymer without significant gel formation.

Another surprising advantage of the present invention is the ability it confers to extract PHAs at lower temperatures (below 150° C.). Without being limited by theory, temperature considerations are important from a commercial standpoint, since the temperature at which a polymer is at least partially solubilized, and the time required for adequate solubilization, can impact capital costs and product quality. For instance, PHAs that have been subjected to lower temperatures for shorter periods of time are typically of higher quality and increased usefulness in downstream manufacturing processes.

The processes and methods herein may also include a wide variety of other variations. The processes and methods of the present invention are described in detail hereinafter.

The present invention relates to a method of extracting structurally flexible PHAs from a biomass using a single main solvent. As used herein, the phrase "extracting structurally flexible PHAs from a biomass", in addition to referring to the extraction of the PHAs produced by a biomass which only produces a single type of PHA, also refers herein to the extraction of one or more types of PHA when the biomass produces more than one type of PHA.

The steps of this method are as follows:

I. Combining the Wet or Dry Biomass Containing the Structurally Flexible PHAs with a Single Main Solvent to Form a Biomass Liquor a) Biomass:

Structurally flexible PHAs are extracted via the process of the present invention from sources including, but not limited to, single-celled organisms, such as bacteria or fungi, and higher organisms, such as plants. These sources are collectively referred to herein as "biomass". While biomass may be comprised of wild-type organisms, they are preferably genetically manipulated species specifically designed for the production of particular PHAs of interest to the grower. Such genetically manipulated organisms are made through the insertion of foreign DNA, which is derived from bacteria that naturally produce PHAs.

The biomass containing the PHAs of interest may be either wet or dry. Wet biomass is comprised by a biomass in a solution such as an aqueous solution. Dry biomass is comprised by biomass from which liquid has been removed using processes including, but not limited to, spray or freeze drying, before the extraction process is initiated. Preferably, the biomass is dry.

Plants useful in the present invention include any genetically engineered plant designed to produce PHAs. Preferred plants include agricultural crops such as cereal grains, oilseeds and tuber plants; more preferably avocado, barley, beet, broad bean, buckwheat, carrot, coconut, copra, corn (maize), cottonseed, gourd, lentil, lima bean, millet, mung bean, oat, oilpalm, pea, peanut, potato, pumpkin, rapeseed (e.g., canola), rice, sorghum, soybean, sugarbeet, sugar cane, sunflower, sweet potato, tobacco, wheat, and yam. Such genetically altered fruit-bearing plants useful in the process of the present invention include, but are not limited to, apple, apricot, banana, cantaloupe, cherry, grape, kumquat, tangerine, tomato, and watermelon. Preferably, the plants are genetically engineered to produce PHAs pursuant to the methods disclosed in Poirier, Y., D. E. Dennis, K. Klomparens and C. Somerville, "Polyhydroxybutyrate, a biodegradable thermoplastic, produced in transgenic plants'" SCIENCE, Vol. 256, pp. 520–523 (1992); and/or U.S. Pat. No. 5,650,555 to Michigan State University, issued Jul. 22, 1997. Particularly preferred plants are soybean, potato, corn, and coconut plants genetically engineered to produce PHAs; more preferably soybean.

Bacteria useful in the present invention include any genetically engineered bacteria designed to produce PHAs, as well as bacteria which naturally produce PHAs. Examples of such bacteria include those disclosed in NOVEL BIODEGRADABLE MICROBIAL POLYMERS, E. A. Dawes, ed., NATO ASI Series, Series E: Applied Sciences—Vol. 186, Kluwer Academic Publishers (1990); U.S. Pat. No. 5,292,860 to Kanegafuchi Kagaku Kogyo Kabushiki Kaisha, issued Mar. 8, 1994; U.S. Pat. No. 5,250,430 to Massachusetts Institute of Technology, issued Oct. 5, 1993; U.S. Pat. No. 5,245,023 to Massachusetts Institute of Technology, issued Sep. 14, 1993; and/or U.S. Pat. No. 5,229,279 to Massachusetts Institute of Technology, issued Jul. 20, 1993.

It is preferable that the biomass contain a sufficient quantity of structurally flexible PHAs to make the extraction process described in the present invention economically desirable. Preferably, the initial content of structurally flexible PHAs in the biomass source material should be at least about 20% of the total dry weight of the biomass; more preferably at least 50%; more preferably still, at least about 60%.

b) Structurally Flexible PHAs:

The PHAs of interest in the present invention are referred to herein as "structurally flexible" PHAs to underscore that the physical disruption caused by the relatively high co-monomer content and relatively long R-group chain length, make them generally more ductile and harder to crystallize than PHAs that are characterized by lower co-monomer content and shorter R-pendant groups (see U.S. Pat. No. 6,043,063 to Monsanto, issued Mar. 28, 2000, and/or U.S. Pat. No. 6,087,471 to Monsanto, issued Jul. 11, 2000).

The structurally flexible PHAs extracted by the process described in the present invention are preferably comprised by at least two randomly repeating monomer units, wherein the first randomly repeating monomer unit has the structure:

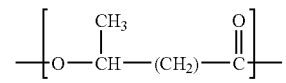

and the second or higher randomly repeating monomer unit has the structure:

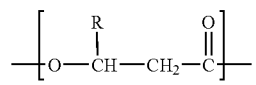

wherein R is a C3 to a C7 alkyl or a mixture thereof; wherein from about 75 mol % to about 99 mol % of the randomly repeating monomer units have the structure of the first randomly repeating monomer unit, and from about 1 mol % to about 25 mol % of the randomly repeating monomer units have the structure of the second randomly repeating monomer unit. The structurally flexible PHAs of interest in the present invention preferably have a melt temperature ("Tm") of about 80° C. or higher.

c) Single Main Solvent:

The wet or dry biomass, containing the structurally flexible PHAs, is combined with a single main solvent to form a biomass liquor. As used herein, the terms "single main solvent" refer to one substance or a mixture of substances that is capable of dissolving the structurally flexible PHAs to form an at least somewhat uniformly dispersed mixture at the ionic size or molecular level. Preferably, the single main solvent is used exclusively throughout the entire extraction process of the present invention, and no second solvent, comprised by one substance or a mixture of substances, is used in the extraction process of the present invention.

The single main solvents useful herein to extract the structurally flexible PHAs from the biomass depend upon whether the biomass is wet or dry. If the biomass is wet, the single main solvents useful herein include a butanol, a pentanol, or a mixture thereof. The pentanol is more preferably iso-pentanol, 1-pentanol, 2-pentanol, 3-pentanol or a mixture thereof. The pentanol is most preferably iso-pentanol. The butanol is preferably iso-butanol. If the biomass is dry, the single main solvents of use in the present invention may include a butanol, a pentanol, toluene or a mixture thereof. The pentanol is more preferably iso-pentanol, 1-pentanol, 2-pentanol, 3-pentanol or a mixture thereof. The pentanol is most preferably iso-pentanol. The butanol is preferably iso-butanol.

The single main solvent is preferably added to the wet or dry biomass in a ratio of from about 50 to about 150 parts of the single main solvent to about 1 part of the wet or dry biomass to form the biomass liquor. More preferably, the single main solvent may be added to the wet or dry biomass in a ratio of from about 100 parts of the single main solvent to about 1 part of the wet or dry biomass to form the biomass liquor.

Preferably, when the biomass and the single main solvent are combined, they are stirred to enable better dispersion of the biomass in the single main solvent to form the biomass liquor.

In one embodiment, the biomass liquor contains the single main solvent and the biomass in a ratio of from about 10 to about 100 parts single main solvent to about 1 part biomass. In another embodiment, the biomass liquor contains the single main solvent and the biomass in a ratio of from about 50 parts single main solvent to about 1 part biomass.

In a preferred embodiment of the present invention, low levels of acetone, namely less than about 10% by weight, may be added to the biomass liquor. Preferably, from about 3% to about 8% by weight of acetone may be added to the biomass liquor. Without wishing to be bound by theory, it is believed that the acetone, when present in the biomass liquor in such a low amount, does not act as a solvent by aiding in the dissolution of the structurally flexible PHAs to form a uniformly dispersed mixture at the ionic size or molecular level. Instead, it is believed that the presence of the acetone in the biomass liquor in such a low amount surprisingly aids in lysing the biomass cells also present in the biomass liquor. By lysing the biomass cells, the acetone may enhance the subsequent solubilization step by exposing more of the structurally flexible PHAs to the PHA-solubilizing single main solvent.

II. Heating the Biomass Liquor to at Least Partially Solubilize the Structurally Flexible PHAs from the Biomass Containing the Structurally Flexible PHAs to Form a PHA Liquor The biomass liquor is then heated to increase the solubilization rate of the structurally flexible PHAs from the biomass to form the PHA liquor. The PHA liquor is comprised by all the cellular components of the biomass including any un-solubilized structurally flexible PHAs, the single main solvent and the at least partially solubilized structurally flexible PHAs. As used herein, the terms "partially solubilized" refer to the theory that some of the structurally flexible PHAs may remain trapped within the biomass cells or fragments of the biomass cells. As a result, some of the structurally flexible PHAs may not be exposed to the single main solvent and will remain in a solid state instead of being solubilized by the single main solvent.

Typically, the PHA liquor is formed by heating the biomass liquor to within from about 5° C. to about 20° C. of the boiling point of the single main solvent. In a preferred embodiment of the invention, the biomass liquor is heated to between about 80° C. to about 130° C. In a more preferred embodiment of the invention, the biomass liquor is heated to between about 90° C. to about 120° C. Without being limited by theory, temperature considerations are important from a commercial standpoint, since the temperature at which a polymer is at least partially solubilized, and the time required for adequate solubilization, can impact capital costs and product quality. Typically the longer the biomass liquor is heated to form the PHA liquor, the higher the yield of structurally flexible PHAs. However, some molecular weight degradation of the structurally flexible PHAs may occur as a result of prolonged heating. Preferably, the biomass liquor is heated from about 30 minutes to about 300 minutes to form the PHA liquor. More preferably, the biomass liquor is heated from about 60 to about 180 minutes. Even more preferably, the biomass liquor is heated from about 100 to about 150 minutes. Most preferably, the biomass liquor is heated for about 120 minutes.

In a preferred embodiment of the present invention, the biomass liquor is stirred during heating to enable better dispersion of the structurally flexible PHAs to form the PHA liquor.

III. Separating the Biomass from the PHA Liquor to Form a PHA-Enriched Liquor

Once the PHA liquor is formed, the cellular components of the biomass, including any structurally flexible PHAs which have not been solubilized after the heating step, are separated from the rest of the PHA liquor leaving behind, what is herein referred to as, the "PHA-enriched liquor". The preferred method of separation is filtration. The more preferred method of separation is high temperature filtration, that is filtration before the PHA liquor cools significantly from the heating step. Particularly preferred filtration devices include Nutsche filters with mixing, heating and washing capabilities, rotary drum pressure filters, and vacuum filters. Other methods of separation includes centrifugarion.

IV. Evaporating from 0% to About 50% of the Single Main Solvent from the PHA-Enriched Liquor to Form a Solvent Vapor and a Concentrated PHA-Enriched Liquor In the next step, from 0% to about 50% of the single main solvent may be evaporated from the PHA-enriched liquor. If more than 0% of the single main solvent is evaporated, a solvent vapor and a concentrated PHA-enriched liquor may be formed. As used herein, the terms "solvent vapor" refer to the gaseous form of the single main solvent. As used herein, the terms "concentrated PHA-enriched liquor" refer to a liquor in which the density of the structurally flexible PHAs is greater in comparison to the density of the structurally flexible PHAs in the PHA-enriched liquor from which it came.

If evaporation of the single main solvent does occur, it is preferred that the PHA-enriched liquor is placed under vacuum in order to speed the evaporation of the single main solvent from the PHA-enriched liquor to form the concentrated PHA-enriched liquor.

No more than about 50% of the single main solvent is evaporated from the PHA-enriched liquor to form the solvent vapor and the concentrated PHA-enriched liquor. Without being limited by theory, it is typically not cost efficient to evaporate more than about 50% of the single main solvent to form the solvent vapor and the concentrated PHA-enriched liquor for two reasons. First, when the single main solvent is evaporated, any impurities that were solubilized by the single main solvent may be left behind in the concentrated PHA-enriched liquor. Therefore, if all of the single main solvent is evaporated, the remaining impurities are preferably removed at some later step in the extraction process in order to obtain pure, precipitated, structurally flexible PHAs. In order to remove these impurities, the structurally flexible PHAs precipitated in the next step must generally be subjected to subsequent washing steps, which may add to the capital costs of the extraction process. Second, because the structurally flexible PHAs of interest may not readily crystallize, removal of over about 50% of the single main solvent may cause the structurally flexible PHAs to entangle and to entrap a portion of the single main solvent to form a gel. In order to obtain pure, precipitated, structurally flexible PHAs, further processing to remove the trapped single main solvent may be required. The added processing may in turn add to the capital costs of the extraction process.

Without being limited by theory, it may be more cost effective to evaporate some of the single main solvent, in other words, over 0% of the solvent, for the following reason. Partial evaporation of the single main solvent from the PHA-enriched liquor may decrease the temperature of the remaining concentrated PHA-enriched liquor. The decreased temperature of the concentrated PHA-enriched liquor may in turn reduce the time necessary to cool the concentrated PHA-enriched liquor to precipitate the structurally flexible PHAs in the subsequent cooling process step. Without being limited by theory, any reduction in the time required to extract structurally flexible PHAs from biomass, including a reduction in cooling time, may reduce the capital costs, and thereby increase the cost effectiveness, of the extraction process.

In a preferred embodiment of the present invention the solvent vapor is captured, cooled to form a solvent liquid, and recycled for further use as a single main solvent. As used herein, the term "recycled" refers to treatment, which includes, but is not limited to the removal of impurities, such as color bodies and proteins.

V. Cooling the Concentrated PHA-Enriched Liquor to Form Precipitated Structurally Flexible PHAs and an Impure Solvent Liquor In this step, the temperature of the concentrated PHA-enriched liquor is reduced until the structurally flexible PHAs precipitate from the concentrated PHA-enriched liquor to leave behind an impure solvent liquor. As used herein, the term "impure" solvent liquor refers to the impurities that may come from the biomass, which may remain in solution, such as color bodies and proteins.

In a preferred embodiment of the present invention, the precipitated structurally flexible PHAs are recovered from the impure solvent liquor. Preferred methods of recovery include, but are not limited to, centrifugation, filtration and pressure filtration. The more preferred recovery method is pressure filtration. Particularly preferred filtration devices include Nutsche filters with mixing, heating and washing capabilities, rotary drum pressure filters, and vacuum filters. In a preferred embodiment of the invention, the impure solvent liquor is recycled for use as the single main solvent in future extraction processes.

Generally, when the structurally flexible PHAs are recovered using the extraction process of the present invention, they may have a characteristic white or gray color. If desired, the color of the structurally flexible PHAs may be further improved in a number of ways. For example, the structurally flexible PHAs may be treated with activated clay or carbon. Preferably, the structurally flexible PHAs may be washed before they dry out, with ethanol and/or fresh single main solvent. As used herein, the terms "fresh single main solvent" relate to single main solvent that has not been previously used in the extraction process, nor used in the extraction process and recycled. More preferably, the structurally flexible PHAs may be washed with fresh single main solvent. Even more preferably, the fresh single main solvent may be recovered after the washing step and recycled for use in the solubilization step. Use of fresh single main solvent for washing of the structurally flexible PHAs is preferred, because it is generally less costly than using substances, such as ethanol or activated clay or carbon, that are not used in any other step in the present invention.

The optimal range of unit operating conditions or individual devices will vary considerably according to the type of raw biomass.

Optional Post-Treating with Oxidizing Agents or Surfactants

After the precipitated structurally flexible PHA is recovered, in addition to (or in place of) the post-treatment techniques described above, it may be desirable to post-treat the PHA with either an oxidizing/bleaching agent or a surfactant in order to remove undesirable color bodies and/or odors. When used herein, oxidizing agents may be used in the amount of from about 0.0001 to about 0.5 parts oxidizing agent to about 1 part PHA, alternatively about 0.01 part oxidizing agent to about 1 part PHA. When peroxide is used, it is typically used as a dilute form (i.e. dispersed in water). When used herein, surfactants may be used in the range of about 0.005 part surfactant to about 1 part PHA.

Oxidizing/bleaching agents useful herein include air, hydrogen peroxide ($H_2O_2$), hypochlorites, bleach compounds including chlorine, bromine, and/or iodine oxidizing compounds, benzoyl peroxide, C9OBS, perborates, and mixtures thereof.

Surfactants useful herein include amine oxide, AES, and other common surfactants, and mixtures thereof.

Washing with surfactants and/or treating with oxidizing agents may result in removal of color bodies resulting in mild to significant color improvement (a whiter sample after treatment), removal of bio-odors, and/or reduction in impurities.

The oxidizing agents and/or surfactants can be used to treat the polyhydroxyalkanoate by washing the wet polymer with the oxidizing agent and/or surfactant. Another option is to use an oxidizing agent (eg. $H_2O_2$) and/or by utilizing a dilute solution during the drying of the polymer.

The use of oxidizing agents during the drying of the Polyhydroxyalkanoate is especially useful if the impurities that are desired to be removed are known to be oxidizable, (such as tri acetone amine impurities from the acetone-water extraction/precipitation process).

The following examples further describe and demonstrate the preferred embodiments within the scope of the present invention. The examples are given solely for the purpose of illustration, and are not to be construed as limitations of the present invention since many variations of the present invention are possible without departing from its spirit and scope.

EXAMPLE 1

Extraction from Wet Biomass

Start with 100 kg of wet biomass produced by a fermentation process. The wet biomass is about 30% solids, and the solids contain about 60% PHA. Add 5 kg of acetone to speed cell lysis. Add 1800 kg iso-butanol. Heat the resulting mixture to 100° C. for 2 hours. Remove the solids, including insoluble non-PHA derived cellular materials, using a Rosenmund filter at a temperature above 75° C. Cool the filtrate containing the PHA to a temperature between 30° C. to 45° C. Filter the resulting slurry using pressure filtration. Pressure filtration should be conducted under 5 bars of pressure, using a 0.2–2 micron media filter. Add 90 kg of fresh iso-butanol to the filter and mix for 10 minutes. Filter the solids in the pressure filter to form a cake consisting of 50% solids. Vacuum-dry the cake. Approximately 17 kg of PHA, white in color, will be obtained. Collect the spent solvent and settle it into rich and lean solvents. Recycle the rich solvent phase. Bleed 10% of the rich solvent phase and all of the lean solvent phase for distillation, and recover the solvents.

EXAMPLE 2

Extraction from Dry Biomass

Start with 50 kg of dry biomass produced by a fermentation process. The dry biomass is about 60% PHA. Add 3000 kg of toluene. Heat the mixture to 100° C. for 2 hours. Remove the solids, including insoluble non-PHA derived cellular materials, using a Rosenmund filter at a temperature above 75° C. Cool the filtrate containing the PHA to a temperature between 30° C. to 45° C. Filter the resulting slurry using pressure filtration. Pressure filtration should be conducted under 5 bars of pressure, using a 0.2–2 micron media filter. Add 150 kg of fresh toluene to the filter and mix for 10 minutes. Filter the solids in the pressure filter to form a cake consisting of 50% solids. Check the color of the cake. If desired, the color may be improved by washing with 150 kg of ethanol. Unload the cake and dry under vacuum. Approximately 27 kg of PHA, white in color, will be obtained. Collect the spent solvent and distill the solvents for recycling.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A process for extracting polyhydroxyalkanoates from a biomass containing the polyhydroxyalkanoates comprising:
    a) combining the biomass containing the polyhydroxyalkanoates with a single main solvent to form a biomass liquor;
    b) heating the biomass liquor to at least partially solubilize the polyhydroxyalkanoates from the biomass containing the polyhydroxyalkanoates to form a PHA liquor;
    c) separating the biomass from the PHA liquor to form a PHA-enriched liquor;
    d) evaporating from 0% to about 50% of the single main solvent from the PHA-enriched liquor to form a solvent vapor and a concentrated PHA-enriched liquor; and
    e) cooling the concentrated PHA-enriched liquor to form precipitated polyhydroxyalkanoates and an impure solvent liquor and recovering the precipitated polyhydroxyalkanoates from the impure solvent liquor by filtration under pressure after cooling said cooling;
wherein the polyhydroxyalkanoates comprise at least two randomly repeating monomer units, wherein the first randomly repeating monomer unit has the structure:

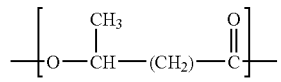

and the second or higher randomly repeating monomer unit has the structure:

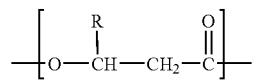

wherein R is a C3 to C7 alkyl or a mixture thereof; wherein from about 75 mol % to about 99 mol % of the randomly repeating monomer units have the structure of the first randomly repeating monomer unit and from about 1 mol % to about 25 mol % of the randomly repeating monomer units have the structure of the second randomly repeating monomer unit; and wherein the single main solvent is a butanol, a pentanol or a mixture thereof and wherein the process further comprises adding from about 3% to about 8% by weight of acetone to the biomass liquor before heating the biomass liquor.

2. The process according to claim 1 wherein the biomass liquor comprises the single main solvent and the biomass in a ratio of about 10–100 parts single main solvent to about 1 part PHA.

3. The process according to claim 1, wherein heating the biomass liquor increases the temperature of the biomass liquor to within from about 5° C. to about 20° C. of the boiling point of the solvent.

4. The process according to claim 1, wherein separating the biomass from the PHA liquor to form the PHA-enriched liquor is performed by high temperature filtration.

5. The process according to claim 1, wherein partially evaporating the solvent with minimum water from the PHA-enriched liquor is performed by applying a vacuum to the PHA-enriched liquor.

6. The process according to claim 5, wherein the solvent vapor is recaptured as a solvent liquid and wherein the solvent liquid is recycled for further extractions.

7. The process according to claim 1, further comprising cooling the solution with PHA and washing the precipitated polyhydroxyalkanoates with the fresh single main solvent after recovering the precipitated polyhydroxyalkanoates from the impure solvent liquor by filtration under pressure.

8. The process according to claim 7, wherein the impure solvent liquor is distilled to recover solvent and the recovered solvent is recycled for further extractions.

9. The process according to claim 1, wherein the pentanol is iso-pentanol, 1-pentanol, 2-pentanol, 3-pentanol or a mixture thereof.

10. The process according to claim 1, wherein the butanol is iso-butanol.

11. The process according to claim 1 wherein after the step of recovering the precipitated polyhydroxyalkanoates from the impure solvent liquor by filtration under pressure, the process further comprises the step:
    f) treating the precipitated polyhydroxyalkanoates with oxidizing agents or mild surfactant or mild bleach to enhance color and odor.

12. A process for extracting a polyhydroxyalkanoates from a dry biomass containing the polyhydroxyalkanoates comprising:

a) combining the dry biomass containing the polyhydroxyalkanoates with a single main solvent to form a biomass liquor;
b) heating the biomass liquor to at least partially solubilize the polyhydroxyalkanoates from the biomass containing the polyhydroxyalkanoates to form a PHA liquor;
c) separating the biomass from the PHA liquor to form a PHA-enriched liquor;
d) evaporating from 0% to about 50% of the single main solvent from the PHA-enriched liquor to form a solvent vapor and a concentrated PHA-enriched liquor; and
e) cooling the concentrated PHA-enriched liquor to form precipitated polyhydroxyalkanoates and an impure solvent liquor and recovering the precipitated polyhydroxyalkanoates from the impure solvent liquor by filtration under pressure after said cooling;

wherein the polyhydroxyalkanoates comprise at least two randomly repeating monomer units, wherein the first randomly repeating monomer unit has the structure:

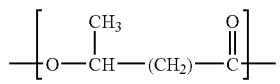

and the second or higher randomly repeating monomer unit has the structure:

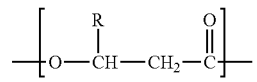

wherein R is a C3 to C7 alkyl or a mixture thereof; wherein from about 75 mol % to about 99 mol % of the randomly repeating monomer units have the structure of the first randomly repeating monomer unit and from about 1 mol % to about 25 mol % of the randomly repeating monomer units have the structure of the second randomly repeating monomer unit; and wherein the single main solvent is a butanol, a pentanol, toluene or a mixture thereof; and wherein the process further comprises adding from about 3% to about 8% by weight of acetone to the biomass liquor before heating the biomass liquor.

13. The process according to claim 12 wherein the biomass liquor comprises the single main solvent and the biomass in a ratio of about 10–100 parts single main solvent to about 1 part PHA.

14. The process according to claim 12, wherein heating the biomass liquor increases the temperature of the biomass liquor to within from about 5° C. to about 20° C. of the boiling point of the solvent.

15. The process according to claim 12, wherein separating the biomass from the PHA liquor to form the PHA-enriched liquor is performed by high temperature filtration.

16. The process according to claim 12, wherein partially evaporating the solvent with minimum water from the PHA-enriched liquor is performed by applying a vacuum to the PHA-enriched liquor.

17. The process according to claim 16, wherein the solvent vapor is recaptured as a solvent liquid and wherein the solvent liquid is recycled for further extractions.

18. The process according to claim 17, further comprising recovering the precipitated polyhydroxyalkanoates from the impure solvent liquor by filtration under pressure after cooling the concentrated PHA-enriched liquor and further comprising washing the precipitated polyhydroxyalkanoates with the fresh single main solvent after recovering the precipitated polyhydroxyalkanoates from the impure solvent liquor by filtration under pressure.

19. The process according to claim 13, wherein the pentanol is iso-pentanol, 1-pentanol, 2-pentanol, 3-pentanol or a mixture thereof.

* * * * *